US012799573B2

(12) United States Patent
Ghassemi-Armaki et al.

(10) Patent No.: US 12,799,573 B2
(45) Date of Patent: Nov. 17, 2026

(54) PRE-TREATMENT OF A SUBSTRATE FOR HOT-DIP COATING

(71) Applicant: GM Global Technology Operations LLC, Detroit, MI (US)

(72) Inventors: Hassan Ghassemi-Armaki, Northville, MI (US); Daniel Ryan, Fenton, MI (US); Shaomao Xu, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/776,100

(22) Filed: Jul. 17, 2024

(65) Prior Publication Data

US 2026/0022443 A1 Jan. 22, 2026

(51) Int. Cl.

| | |
|---|---|
| ***C23C 2/02*** | (2006.01) |
| ***B23K 26/362*** | (2014.01) |
| ***C23C 2/00*** | (2006.01) |
| ***C23C 2/04*** | (2006.01) |
| ***C23C 2/26*** | (2006.01) |
| ***C23C 24/04*** | (2006.01) |
| ***C23C 28/00*** | (2006.01) |
| ***H01M 50/50*** | (2021.01) |
| *B23K 101/36* | (2006.01) |

(52) U.S. Cl.

CPC ............ *C23C 2/026* (2022.08); *B23K 26/362* (2013.01); *C23C 2/0035* (2022.08); *C23C 2/0038* (2022.08); *C23C 2/0064* (2022.08); *C23C 2/022* (2022.08); *C23C 2/04* (2013.01); *C23C 2/26* (2013.01); *C23C 24/04* (2013.01); *C23C 28/32* (2013.01); *C23C 28/345* (2013.01); *H01M 50/50* (2021.01); *B23K 2101/36* (2018.08)

(58) Field of Classification Search

CPC ............................... C23C 2/026; H01M 50/50

See application file for complete search history.

(56) References Cited

U.S. PATENT DOCUMENTS

| | | | | |
|---|---|---|---|---|
| 4,716,270 A * | 12/1987 | Gnanamuthu | C23F 1/02 | 216/75 |
| 4,888,206 A * | 12/1989 | Hope | H01M 4/0483 | 427/457 |
| 5,080,932 A * | 1/1992 | Koksbang | C23C 2/006 | 427/209 |
| 5,169,446 A * | 12/1992 | Koksbang | B05C 1/0813 | 228/43 |

(Continued)

FOREIGN PATENT DOCUMENTS

| | | |
|---|---|---|
| CA | 1241573 A | 9/1988 |
| DE | 102021001741 A1 | 10/2022 |

*Primary Examiner* — Karl Kurple

(74) *Attorney, Agent, or Firm* — Honigman LLP; Matthew H. Szalach

(57) ABSTRACT

A hot-dip coating system comprising a substrate pathway comprising one or more rollers configured to move a substrate along the substrate pathway between a first end and a second end, a pre-coating section arranged with respect to the substrate pathway and configured to apply a first coating to the substrate, a pre-heating section arranged with respect to the substrate pathway and configured to heat the substrate and the first coating, and a hot-dip coating section arranged with respect to the substrate pathway and configured to apply a second coating to the substrate.

20 Claims, 5 Drawing Sheets

(56) References Cited

U.S. PATENT DOCUMENTS

| | | | | | |
|---|---|---|---|---|---|
| 6,134,773 | A * | 10/2000 | Kejha | H01M 6/188 | 29/730 |
| 6,180,933 | B1 * | 1/2001 | Demidovitch | H05B 6/067 | 219/662 |
| 12,482,802 | B2 * | 11/2025 | Wang | H01M 4/134 | |
| 2009/0023012 | A1 * | 1/2009 | Carey, II | C23C 2/06 | 428/615 |
| 2010/0062163 | A1 * | 3/2010 | Bordignon | C23C 2/0224 | 427/318 |
| 2015/0354049 | A1 * | 12/2015 | Krengel | C23C 2/0036 | 427/543 |
| 2016/0017452 | A1 * | 1/2016 | Puerta Velasquez | C21D 8/0278 | 148/333 |
| 2017/0002438 | A1 * | 1/2017 | Patard | C21D 9/60 | |
| 2020/0081423 | A1 * | 3/2020 | Clark | H10P 72/0461 | |
| 2022/0271264 | A1 * | 8/2022 | Xu | H01M 4/134 | |
| 2022/0280966 | A1 * | 9/2022 | Li | B05C 1/0817 | |
| 2024/0295000 | A1 * | 9/2024 | Van Krevel | C21D 8/0478 | |

* cited by examiner

PRE-TREATMENT OF A SUBSTRATE FOR HOT-DIP COATING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a hot-dip coating system and, more particularly, to a system for pre-treating a substrate prior to entering a molten bath.

Hot-dip coating can involve applying a molten coating onto a surface of a substrate in a continuous process. The substrate can be passed as a continuous ribbon through a bath of molten material. In the molten bath, the substrate reacts with the molten material to bond the coating with the substrate. In some examples, the molten material adheres to the surface of the substrate and, in other examples, the molten material is joined to the substrate by embedding into at least a portion of the substrate.

Quality issues during hot-dip coating processes can arise depending on the material of the substrate and the material of the molten bath. For instance, some substrate materials are good heat conductors (e.g., copper), which can lead to undesirable local solidification of the molten material (e.g., lithium) on a surface of the substrate. Shortcomings of existing hot-dip processes will be addressed by one or more principles of the present disclosure.

SUMMARY

In one configuration, a hot-dip coating system is provided and includes a substrate pathway including one or more rollers configured to move a substrate along the substrate pathway between a first end and a second end, a pre-coating section arranged with respect to the substrate pathway and configured to apply a first coating to the substrate, a pre-heating section arranged with respect to the substrate pathway and configured to heat the substrate and the first coating, and a hot-dip coating section arranged with respect to the substrate pathway and configured to apply a second coating to the substrate.

The hot-dip coating system may include one or more of the following optional aspects. For example, the hot-dip coating system can further include a masking section preceding the pre-coating section with respect to the substrate pathway. The masking section can be configured to apply a mask to a portion of the substrate. The hot-dip coating system can further include one or more quality assessment sections arranged with respect to the substrate pathway. According to one aspect, the one or more quality assessment sections include a first quality section that directly precedes the masking section and a second quality section that is arranged directly after the pre-coating section. According to another aspect, the hot-dip coating system can further include a finishing section arranged with respect to the substrate pathway and is configured to remove the mask and trim off untreated portions of the substrate.

According to at least one aspect, the substrate includes copper, the first coating includes a zinc-oxide material, and the second coating includes a lithium-based material.

According to another aspect, the pre-heating section includes one or more heaters arranged with respect to a first surface of the substrate and with respect to a second surface of the substrate. The one or more heaters can be configured to emit heat at a temperature between 180° C. and 250° C. According to one example, a heating rate of the substrate and the first coating is adjustable based on a distance between the one or more heaters and the substrate and an angle of the one or more heaters with respect to the substrate. According to another example, the one or more heaters can include induction heaters or vertical-cavity surface-emitting laser (VCSEL) heaters.

In another configuration, a method of manufacturing a current collector for a battery of a vehicle is provided. The method includes providing a substrate including a first surface, a second surface opposite the first surface, a first side, and a second side spaced laterally from the first side, applying a mask to a portion of the first surface and the second surface and the first and second sides of the substrate, applying a first coating to the first surface and the second surface of the substrate, pre-heating the substrate and the first coating with one or more heaters arranged adjacent to the substrate, submerging the substrate in a molten bath of a second coating so that the second coating can adhere to the substrate, removing the mask, and trimming the substrate at the first side and the second side.

The method may include one or more of the following optional aspects. For example, providing a substrate may include providing a substrate including copper.

According to one aspect, the method of manufacturing the current collector further includes applying the first coating as a cold spray. The method of manufacturing the current collector can further include applying the first coating including a zinc oxide material.

According to another aspect, pre-heating the substrate and the first coating further includes sandwiching the substrate between the one or more heaters.

According to at least one example, pre-heating the substrate and the first coating further includes arranging the one or more heaters with respect to the first surface or the second surface of the substrate.

According to another example, pre-heating the substrate and the first coating further includes arranging the one or more heaters with respect to the first side or the second side of the substrate.

According to at least one aspect, the method of manufacturing the current collector further includes providing the second coating including a lithium material.

According to another aspect, the method of manufacturing the current collector further includes assessing the quality of the substrate and the first coating.

According to at least one example, trimming the substrate at the first side and the second side further includes providing a laser for removing untreated portions of the substrate.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
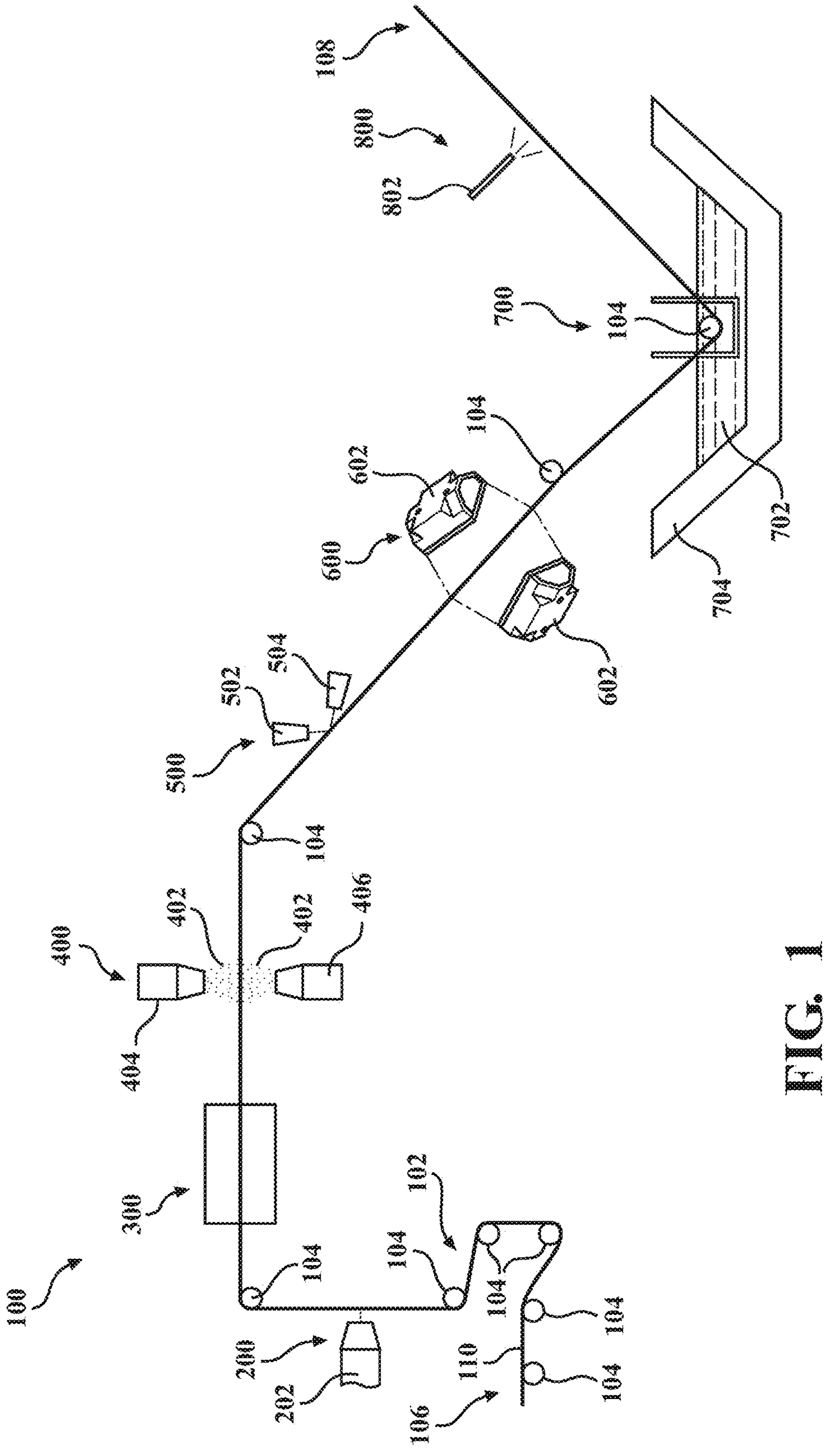
FIG. 1 is a schematic diagram of a hot-dip coating system according to principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Copper-based current collectors can be added to energy storage systems, such as lithium-ion batteries, sodium-ion or sodium metal batteries, or super capacitors, due to their conductivity, structural stability, and ease of fabrication. Coating copper-based current collectors with one or more materials, such as lithium, can improve performance of lithium-ion batteries. However, it can be challenging to obtain a smooth and/or even layer of lithium on the copper-based current collector because copper is an exceptional conductor of heat. Generally, local solidification of lithium will occur on the copper-based current collector when entering a molten bath of lithium. This is undesirable so further improvement is necessary.

With reference to FIG. 1, a schematic diagram of a hot-dip coating system 100 is provided. A substrate track or pathway 102 comprising one or more rollers 104 extends between a first end 106 and a second end 108. One or more pre-treatment sections, zones, and/or stations are arranged with respect to the substrate pathway 102. As will be discussed below, the one or more pre-treatment sections can be configured to assess, treat, and/or modify a substrate 110 prior to entering a molten bath of material. The rollers 104 can be arranged to control the position (i.e., horizontal, vertical, angled, etc.) and movement of the substrate 110 between the first end 106 and the second end 108.

Figure 2:
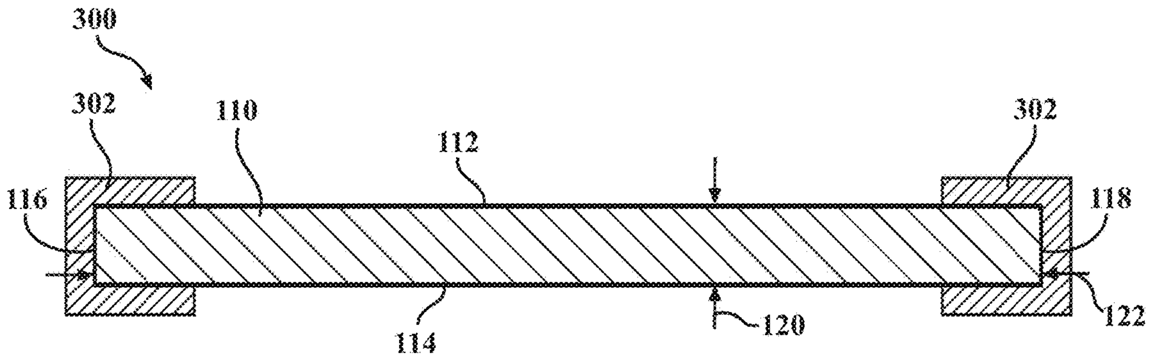
FIG. 2 is a cross-sectional view of a substrate of FIG. 1 with a mask on a portion of the substrate.

The substrate 110 can include a continuous roll of material (e.g., foil, wire, etc.) or an individual component (e.g., a blank). In the present example, the substrate 110 can be stored as a roll of copper foil (not shown) and can be arranged with respect to the substrate pathway 102 so that the substrate 110 can be continuously fed between the first end 106 and the second end 108. Additional rolls of material can be coupled together (e.g., via soldering, welding, or otherwise) so that the substrate 110 can be processed without interruption. The substrate 110 includes a first or upper surface 112, a second or lower surface 114 opposite the first surface 112, a first side 116, and a second side 118 spaced laterally from the first side 116, as shown in FIG. 2. The substrate 110 includes a thickness 120 between the first surface 112 and the second surface 114 and a width 122 between the first side 116 and the second side 118.

While not shown in FIG. 1, the hot-dip coating system 100 can include a section for cleaning and/or preparing the substrate 110 for processing. In other words, the substrate 110 can be treated with a cleaning agent or another preparation that removes oil, dust, and/or debris present on the substrate 110, for example. With reference again to FIG. 1, the hot-dip coating system 100 can further include one or more quality assessment sections for assessing physical and/or chemical characteristics of the substrate 110. For instance, a first quality assessment section 200 is arranged with respect to the substrate pathway 102 and can be configured to determine a flatness and/or a thickness of the substrate 110. In the present example, the flatness and/or the thickness is evaluated using a laser profile measurement system 202.

With continued reference to FIG. 1, the hot-dip coating system 100 includes a masking section 300 arranged directly after the first quality assessment section 200 with respect to the substrate pathway 102. The masking section 300 can be configured to cover or mask a portion of the substrate 110. In other words, a portion of the first surface 112, the second surface 114, the first side 116, and the second side 118 of the substrate 110 can be covered with a mask 302, as shown in FIG. 2. According to one aspect, the material of the mask 302 is a removable material that can be mechanically removed or removed by a user at some point downstream from the masking section 300. The mask 302 is configured to temporarily protect portions of the substrate 110 from being coated with one or more materials as the substrate 110 travels toward the second end 108. Thus, when the mask 302 is removed, the substrate 110 includes an untreated portion 304 on the first surface 112, the second surface 114, the first side 116, and the second side 118. According to another aspect, the mask 302 is made of a flexible material that can easily follow the movement of the substrate 110 as it travels along the rollers 104 toward the second end 108 of the substrate pathway 102.

Figure 3:
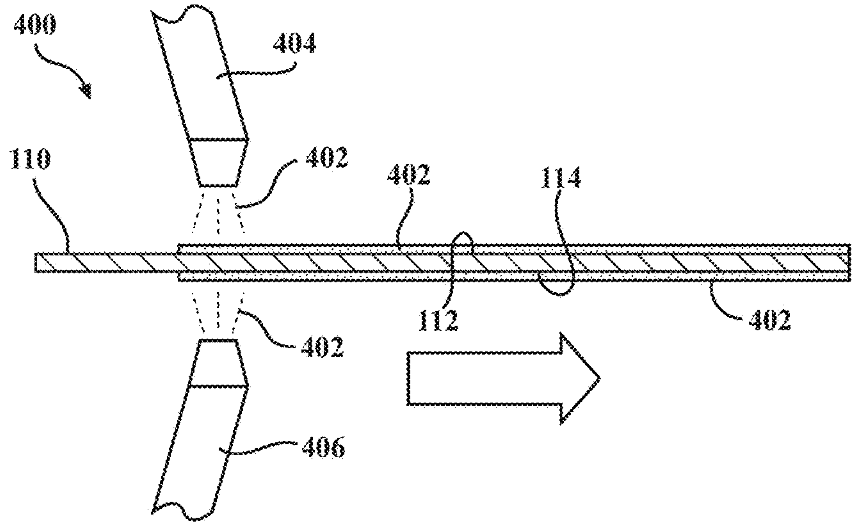
FIG. 3 is a close-up view of a pre-coating section of the hot-dip coating system of FIG. 1.
Figure 4:
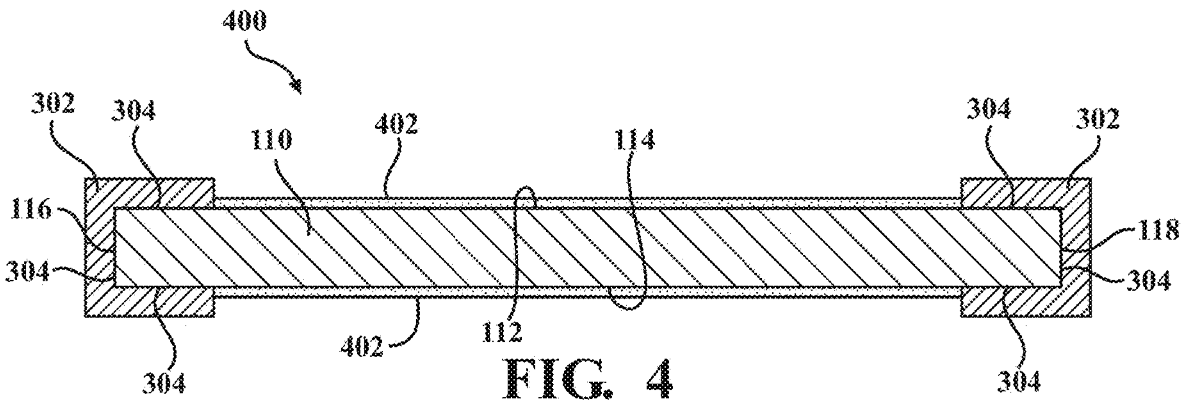
FIG. 4 is a cross-sectional view of the substrate of FIG. 1 with a first coating arranged on a first surface and a second surface of the substrate.
Figure 5:
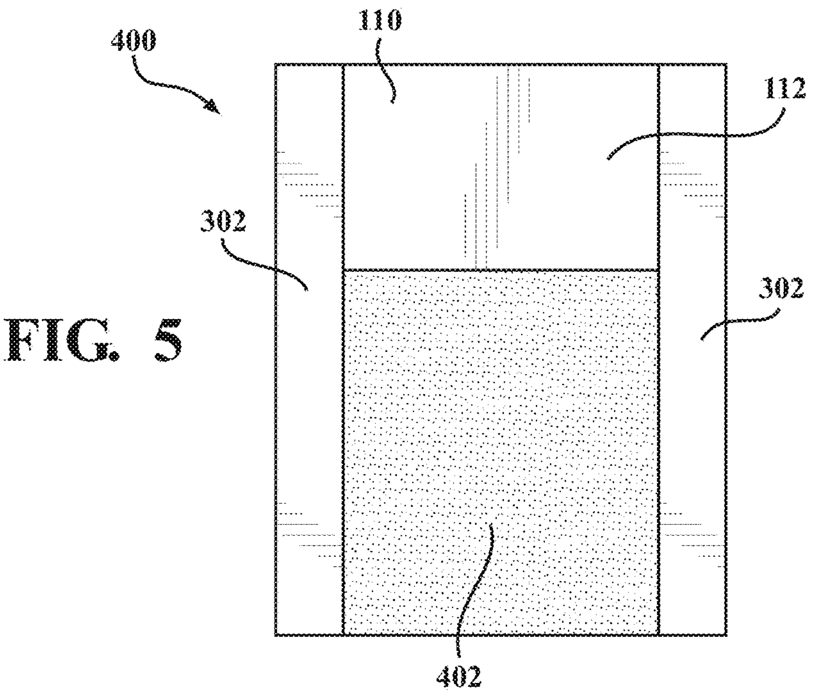
FIG. 5 is a top view of the substrate of FIG. 4.

With reference again to FIG. 1, the hot-dip coating system 100 includes a pre-coating section 400 arranged directly after the masking section 300 with respect to the substrate pathway 102. The pre-coating section 400 can be configured to apply (e.g., spray, mist, etc.) a first coating or material 402 onto the first surface 112 and/or the second surface 114 of the substrate 110, as shown in FIGS. 4 and 5. As shown in FIG. 3, the pre-coating section 400 can include one or more first or upper sprayers 404 arranged adjacent the first surface 112 and one or more second or lower sprayers 406 arranged adjacent the second surface 114. In the present example, the substrate 110 can move horizontally (see arrow in FIG. 3) while the first coating 402 is applied to the first surface 112 and/or the second surface 114 by the one or more first sprayers 404 and/or the one or more second sprayers 406. In another example, the substrate pathway 102 can be arranged so that the substrate 110 moves or is pulled vertically upwardly while the first coating 402 is applied to the first surface 112 and/or the second surface 114. Different orientations of the substrate 110 can be desirable so that the first coating 402 is evenly applied on the substrate 110, for example. According to one aspect, the first coating 402 can be made of a zinc oxide material. According to another aspect, the first coating 402 can be applied as a cold spray onto the substrate 110. The first coating 402 can be desirable to improve adherence of another material (e.g., lithium) to the substrate 110, as will be discussed in more detail below.

With reference again to FIG. 1, the hot-dip coating system 100 can include a second quality assessment section 500 for assessing physical characteristics of the substrate 110. The second quality assessment section 500 can be arranged directly after the pre-coating section 400 with respect to the substrate pathway 102 and can be configured to evaluate oxide thickness and/or oxide type on the substrate 110. In the present example, an x-ray fluorescence spectroscopy (XRF) source 502 and a XRF detector 504 can be used to determine the oxide thickness and/or the oxide type of the substrate 110.

Figure 6:
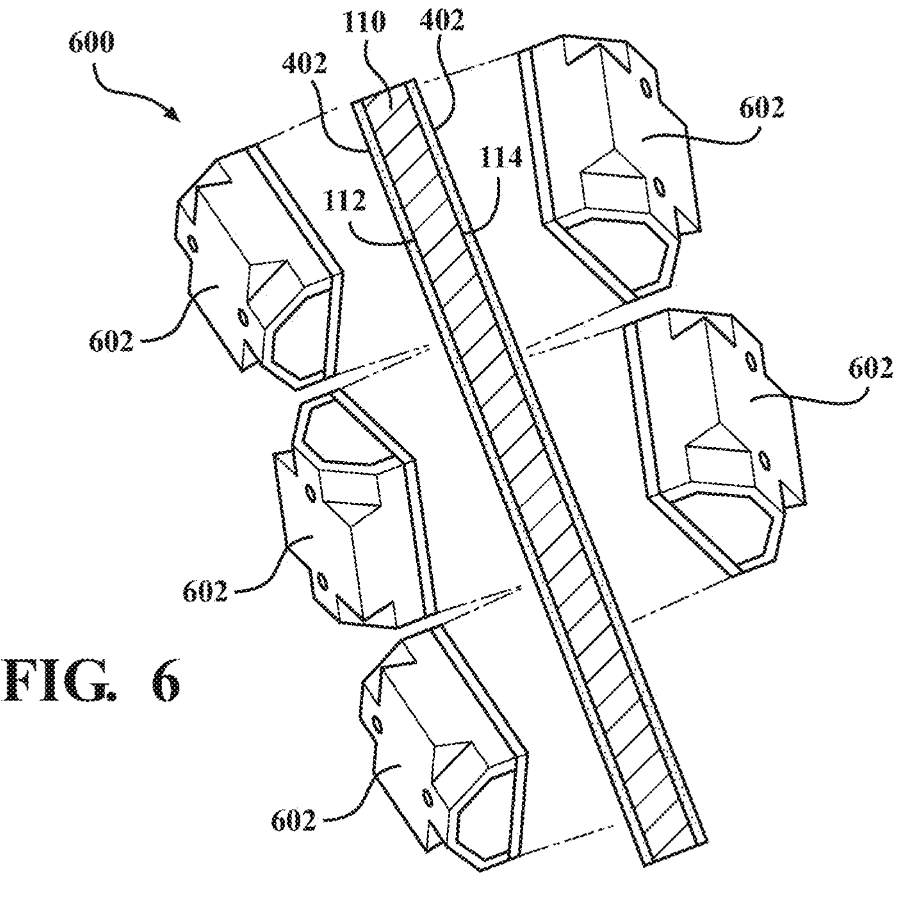
FIG. 6 is a close-up view of a configuration of a preheating section of the hot-dip coating system of FIG. 1.

The hot-dip coating system 100 further includes a pre-heating section 600 that is arranged after the pre-coating section 400 and, in the present example, is arranged directly after the second quality assessment section 500 with respect to the substrate pathway 102. With reference to FIG. 6, the pre-heating section 600 is configured to emit heat toward the substrate 110 to increase the temperature of the substrate 110 and/or the first coating 402. The pre-heating section 600 can include one or more heaters 602 arranged adjacent to the substrate pathway 102, as shown in FIGS. 1 and 6. According to one aspect, the one or more heaters 602 can be induction heaters or Vertical-Cavity Surface-Emitting Laser (VCSEL) heaters. According to another aspect, the one or more heaters 602 can include a temperature of about 180° C. to 250° C. and each of the heaters 602 can be maintained at about the same temperature or at different temperatures. In general, there are several possible arrangements of the one or more heaters 602 within the pre-heating section 600. For instance, the one or more heaters 602 can be arranged with respect to the first surface 112 and/or the second surface 114 or with respect to the first side 116 and/or the second side 118. In at least one example, the one or more heaters 602 can be arranged in a top-down configuration where the substrate 110 travels vertically downwardly through an arrangement of the one or more heaters 602. In another example, the substrate 110 can be sandwiched between two or more of the one or more heaters 602. Additionally or alternatively, a heated roller (not shown) can be configured to contact and increase the temperature of the substrate 110 and/or the first coating 402 as the substrate 110 passes over the heated roller. According to another aspect, the one or more heaters 602 can be arranged at different distances from the substrate 110 or at different angles with respect to the substrate 110. Arranging the one or more heaters 602 at different distances and/or at different angles with respect to the substrate 110 can be desirable to maintain a heating rate of the substrate 110 and/or the first coating 402. Pre-heating the substrate 110 and/or the first coating 402 can be desirable to reduce a residence time of the substrate 110 in a hot-dip coating section 700 of the hot-dip coating system 100.

With reference again to FIG. 1, the hot-dip coating section 700 is arranged directly after the pre-heating section 600 with respect to the substrate pathway 102. The hot-dip coating section 700 is configured to coat the substrate 110 with a second coating or material 702. In the present example, the hot-dip coating section 700 includes a furnace 704 which maintains a molten bath of the second coating 702. According to one aspect, the second coating 702 is made primarily of lithium.

Figure 7:
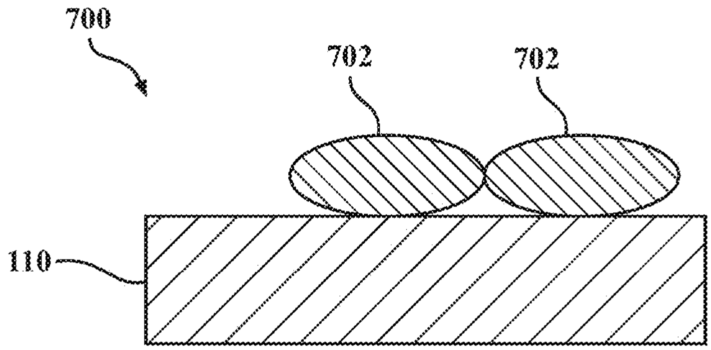
FIG. 7 is a close-up cross-sectional view of a substrate including one or more local solidifications of a second coating.

Heretofore, with reference to FIG. 7, local solidification of lithium commonly occurs on the surface of a copper substrate when placed into a molten bath of lithium when the copper substrate is not pre-treated. The local solidifications of lithium can eventually re-melt if the substrate remains in the molten bath for an extended duration (i.e., increased residence time). However, this commonly results in dissolution of the underlying copper substrate which affects the integrity of the substrate and can result in ripping or tearing of the substrate, for example.

Figure 8:
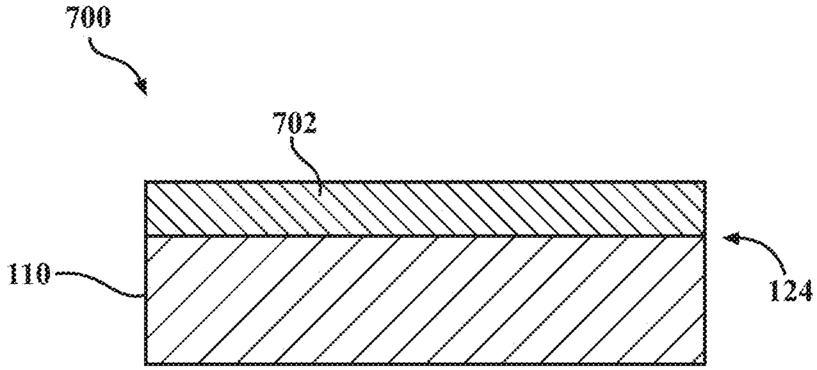
FIG. 8 is a close-up cross-sectional view of a substrate including an evenly distributed layer of a second coating.

With reference to FIG. 8, the pre-treatment sections introduced above are desirable because they reduce the residence time of the substrate 110 within the molten bath and also ensure that local solidification of the second coating 702 (e.g., lithium) does not occur on the surface of the substrate 110. In other words, the pre-coating section 400 and the pre-heating section 600 are desirable for maintaining the integrity of the underlying substrate 110 as well as ensuring the second coating 702 evenly adheres to the substrate 110. Additionally, as a result of the pre-treatment sections, the second coating 702 can bond with, fuse with, or be at least partially embedded into the substrate 110 to create a strong connection between the second coating 702 and the substrate 110. After the substrate 110 is coated with the second coating 702 and as the substrate 110 is removed from the hot-dip coating section 700, an interlocked portion 124 forms between the second coating 702 and the substrate 110.

With reference again to FIG. 1, a finishing section 800 can be arranged directly after the hot-dip coating section 700 with respect to the substrate pathway 102. The finishing section 800 can be configured to remove the mask 302 from the substrate 110 and reveal the untreated portion 304 of the substrate 110. Additionally, the finishing section 800 can include a laser or trimming mechanism 802 to cut, trim, and/or remove the untreated portion 304. The mask 302 can be particularly desirable so that laser 802 only has to cut through one material (i.e., copper) rather than multiple materials (i.e., lithium and copper).

Figure 9:
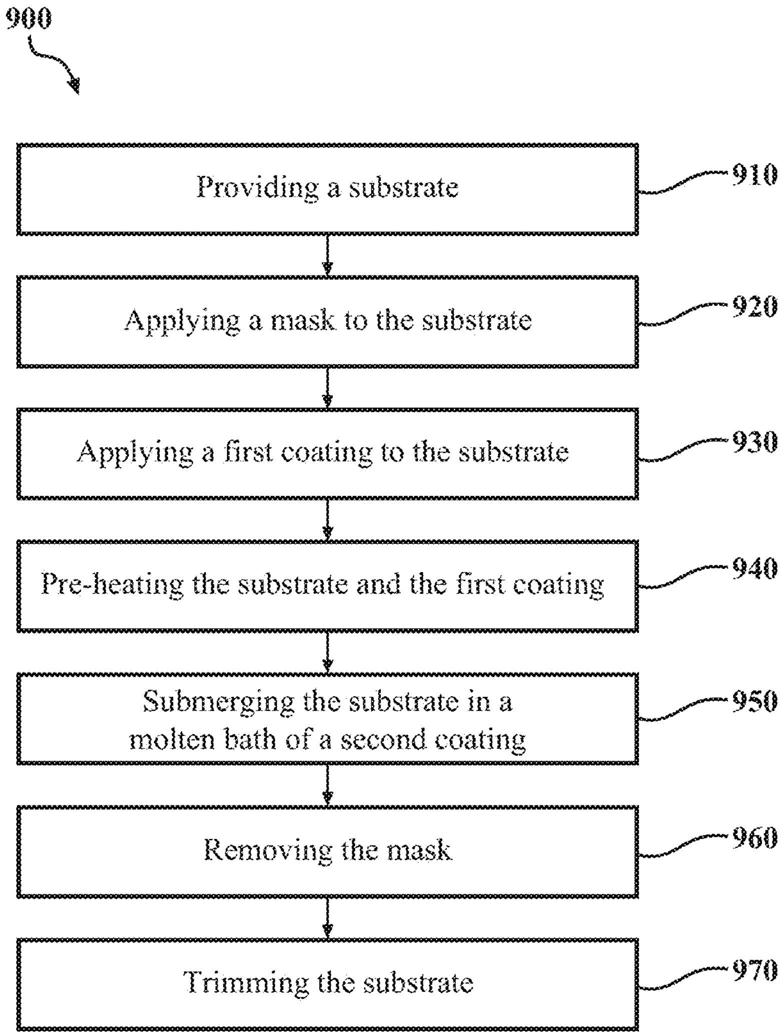
FIG. 9 is a flow diagram of a method of manufacturing a current collector of a battery for a vehicle according to principles of the present disclosure.

With reference to FIG. 9, a method 900 of manufacturing a current collector for a battery of a vehicle is provided. At 910, the substrate 110 is provided that includes the first surface 112, the second surface 114 opposite the first surface 112, the first side 116, and the second side 118 spaced laterally from the first side 116.

At 920, the mask 302 is applied to a portion of the first surface 112 and the second surface 114 and the first and second sides 116, 118 of the substrate 110.

At 930, the first coating 402 is applied to the first surface 112 and the second surface 114 of the substrate 110.

At 940, the substrate 110 and/or the first coating 402 is pre-heated with the one or more heaters 602 arranged adjacent to the substrate 110.

At 950, the substrate 110 is submerged in the molten bath of the second coating 702 so that the second coating 702 can cover and/or adhere to the substrate 110.

At 960, the mask 302 is removed from the substrate 110 to reveal the untreated portion 304 of the substrate 110.

At 970, the substrate 110 can be trimmed at the first side 116 and the second side 118 with the laser 802 to remove the untreated portions 304 of the substrate 110.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A hot-dip coating system, comprising:

a substrate pathway comprising one or more rollers configured to move a substrate along the substrate pathway between a first end and a second end;

a pre-coating section arranged with respect to the substrate pathway and configured to apply a first coating as a cold spray to the substrate;

a quality assessment section arranged directly after the pre-coating section, the quality assessment section including an x-ray fluorescence (XRF) source and an XRF detector configured to determine at least one of an oxide thickness and an oxide type of the substrate;

a pre-heating section arranged with respect to the substrate pathway and configured to heat the substrate and the first coating, the pre-heating section including one or more heaters configured to heat the substrate and the first coating to a temperature of at least 180° C., the temperature being set based at least in part on the oxide thickness and the oxide type of the substrate determined by the quality assessment section; and a hot-dip coating section arranged directly after the pre-heating section with respect to the substrate pathway and configured to apply a second coating to the substrate, the hot-dip coating section including a furnace maintaining a molten bath of the second coating.

2. The hot-dip coating system of claim 1, further comprising a masking section preceding the pre-coating section with respect to the substrate pathway, the masking section being configured to apply a mask to a portion of the substrate.

3. The hot-dip coating system of claim 2, wherein the quality assessment section includes one or more quality assessment sections arranged with respect to the substrate pathway.

4. The hot-dip coating system of claim 3, wherein the one or more quality assessment sections include a first quality assessment section that directly precedes the masking section and a second quality assessment section that is arranged directly after the pre-coating section.

5. The hot-dip coating system of claim 3, further comprising a finishing section arranged with respect to the substrate pathway and configured to remove the mask and trim off untreated portions of the substrate.

6. The hot-dip coating system of claim 1, wherein the substrate includes copper, the first coating includes a zinc-oxide material, and the second coating includes a lithium-based material.

7. The hot-dip coating system of claim 1, wherein the one or more heaters are arranged with respect to a first surface of the substrate and with respect to a second surface of the substrate.

8. The hot-dip coating system of claim 7, wherein the one or more heaters are configured to emit heat at a temperature between 180° C. and 250° C.

9. The hot-dip coating system of claim 7, wherein a heating rate of the substrate and the first coating is adjustable based on a distance between the one or more heaters and the substrate and an angle of the one or more heaters with respect to the substrate.

10. The hot-dip coating system of claim 7, wherein the one or more heaters include induction heaters or vertical-cavity surface-emitting laser (VCSEL) heaters.

11. A method of manufacturing a current collector for a battery of a vehicle comprising:

providing a hot-dip coating system, the hot-dip coating system including:

a substrate pathway comprising one or more rollers configured to move a substrate along the substrate pathway between a first end and a second end;

a pre-coating section arranged with respect to the substrate pathway and configured to apply a first coating as a cold spray to the substrate;

a quality assessment section arranged directly after the pre-coating section, the quality assessment section including an x-ray fluorescence (XRF) source and an XRF detector configured to determine at least one of an oxide thickness and an oxide type of the substrate;

a pre-heating section arranged with respect to the substrate pathway and configured to heat the substrate and the first coating, the pre-heating section including one or more heaters configured to heat the substrate and the first coating to a temperature of at least 180° C., the temperature being set based at least in part on the oxide thickness and the oxide type of the substrate determined by the quality assessment section; and a hot-dip coating section arranged directly after the pre-heating section with respect to the substrate pathway and configured to apply a second coating to the substrate, the hot-dip coating section including a furnace maintaining a molten bath of the second coating;

providing the substrate including a first surface, a second surface opposite the first surface, a first side, and a second side spaced laterally from the first side;

applying a mask to a portion of the first surface, the second surface, and the first and second sides of the substrate;

applying, at the pre-coating section, the first coating to the first surface and the second surface of the substrate;

determining, at the quality assessment section arranged directly after the pre-coating section, at least one of the oxide thickness and the oxide type of the substrate;

pre-heating, at the pre-heating section, the substrate and the first coating with the one or more heaters arranged adjacent to the substrate, the one or more heaters configured to heat the substrate and the first coating to a temperature of at least 180° C., the temperature being set based at least in part on the oxide thickness and the oxide type of the substrate determined by the quality assessment section;

submerging, at the hot-dip coating section directly after the pre-heating section, the substrate in the molten bath of the second coating so that the second coating can adhere to the substrate, the hot-dip coating section including a furnace maintaining the molten bath of the second coating;

removing the mask; and trimming the substrate at the first side and the second side.

12. The method of manufacturing the current collector of claim 11, further comprising applying the first coating as a cold spray.

13. The method of manufacturing the current collector of claim 12, wherein applying the first coating includes applying a zinc-oxide material.

14. The method of manufacturing the current collector of claim 11, wherein pre-heating the substrate and the first coating further comprises sandwiching the substrate between the two or more heaters.

15. The method of manufacturing the current collector of claim 11, wherein pre-heating the substrate and the first coating further comprises arranging the one or more heaters with respect to the first surface or the second surface of the substrate.

16. The method of manufacturing the current collector of claim 11, wherein pre-heating the substrate and the first coating further comprises arranging the one or more heaters with respect to the first side or the second side of the substrate.

17. The method of manufacturing the current collector of claim 11, wherein submerging the substrate in the molten bath of the second coating includes submerging the substrate in the second coating including lithium.

18. The method of manufacturing the current collector of claim 11, further comprising assessing a quality of the substrate and the first coating.

19. The method of manufacturing the current collector of claim 11, wherein trimming the substrate at the first side and the second side further includes using a laser to remove untreated portions of the substrate.

20. The method of manufacturing the current collector of claim 11, wherein trimming the substrate includes trimming off untreated portions of the substrate.

* * * * *